United States Patent [19]

Sano

[11] Patent Number: 4,539,478
[45] Date of Patent: Sep. 3, 1985

[54] METHOD AND APPARATUS FOR PICTURE SIGNAL ENHANCEMENT

[75] Inventor: Tetsuo Sano, Kyoto, Japan

[73] Assignee: Dainippon Screen Mfg. Co., Ltd, Kyoto, Japan

[21] Appl. No.: 460,352

[22] Filed: Jan. 24, 1983

[30] Foreign Application Priority Data

Feb. 16, 1982 [JP] Japan ................................ 57-23798

[51] Int. Cl.³ .............................................. H04N 1/04
[52] U.S. Cl. .................................. 250/235; 346/108; 350/6.6; 358/282; 358/284
[58] Field of Search ............... 250/234–236; 350/6.5–6.91, 358; 358/78, 284, 285, 293, 201, 199, 282; 346/108

[56] References Cited

U.S. PATENT DOCUMENTS

| | | | |
|---|---|---|---|
| 3,725,574 | 4/1973 | Gast | 346/108 |
| 4,237,481 | 12/1980 | Aughton | 358/284 |
| 4,310,757 | 1/1982 | Check, Jr. et al. | 250/236 |
| 4,335,407 | 6/1982 | Atoji et al. | 358/284 |
| 4,484,232 | 11/1984 | Gast | 358/284 |

*Primary Examiner*—Edward P. Westin

[57] ABSTRACT

A picture scanning and recording system in which a scanning for "sharp" signals and a scanning for "unsharp" signals are alternately conducted, each in half periods of scanning, by means of a common photoelectric converter. One of these two series of signals is temporarily stored in a memory for synchronous processing with the other series of signals that is just being produced in such a manner that no inconformity is brought about into recording signals of detail contrast.

4 Claims, 6 Drawing Figures

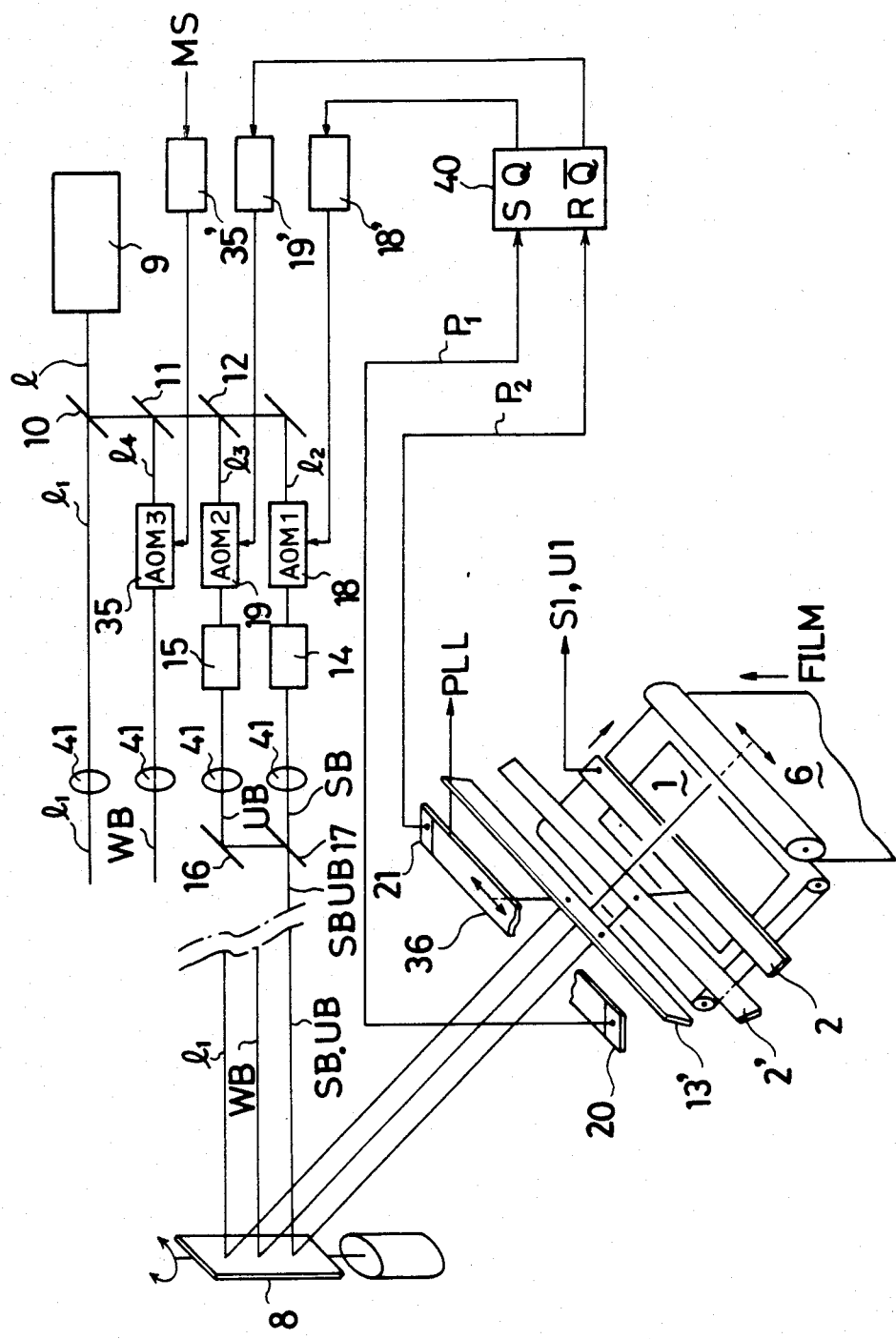

METHOD AND APPARATUS FOR PICTURE SIGNAL ENHANCEMENT

BACKGROUND OF THE INVENTION

The invention relates to a picture scanning and recording method and an apparatus for carrying out the method. More particularly, the invention relates to a system and a method including two scanning beams having different sizes of focused areas which are alternately projected in principal scan directions upon an original picture to be duplicated. The two scanning beams produce "sharp" signals (raw image signals) and "unsharp" signals that in turn are processed with each other to form a series of final image signals which have detail emphasizing components in accordance with the detail portions of said original picture, whereby the image signals serve to control recording or exposing beam so as to produce highly contrasted duplicates.

In said system, it is popular to move the original picture in a subordinate direction at right angles to the principal scanning direction such that the scanning beams are switched over one to another at the ends of forward and backward scan passages respectively adapted to produce series of "sharp" signals and "unsharp" signals or vice versa.

There are two known methods in relation to the above system. One of the known methods as disclosed in U.S. Pat. No. 4,080,634 utilizes a common photosensor to detect optical signals and produce the electric raw image signals (hereinafter called "sharp" signals) and "unsharp" signals. However, use of a The single photosensor makes it necessary to modify one of the scanning beams in order to separately sense optical signals produced by these two beams. The modified and unmodified beams are arranged to have the same optical axis. These beams of scanning light are reflected by or transmitted through the optical picture and detected by the single common photosensor. One series of detected signals originating from the modified beam are then processed in a demodulation device so that they can normally be compared with the other series of signals originating from the unmodified beam. It is however impossible to separate with an absolute correctness the two series of said signals, even if the demodulation was conducted with the highest possible accuracy. Moreover, as devices are developed which scan at increasingly faster speeds, it will become more difficult to accurately modify the scanning beam at a speed higher than that of detection and electronic processing of detected data.

In the other known method, individual photosensors are used, respectively, for the "sharp" and "unsharp" signals. Scanning light beams having different wave lengths are used to produce these two signals according to a proposed technique disclosed in Japanese Examined Publication Gazette (Patent) No. Sho. 54-22122 in the name of the applicant of the present application. For example, a red light is assigned to the "sharp" signals and a blue light is assigned to the "unsharp" signals. The photosensors are provided with proper filters to detect only the scanning beams with the assigned colors. This technique, which is free from the problems inevitable in the first known method, is, however, not available for a polychromatic original picture because red or blue portions thereof are very likely to produce detail emphasizing signals ("unsharp mask signals") despite a lack of variance in brightness at or adjacent said portions. Additional drawbacks of the above technique are a difficulty in balancing the sensitivities of the dual photosensors and a complicated structure for accommodation of two sources of light and two photosensors.

The applicant has proposed a third method described in Japanese Early Publication Gazette (Patent) Sho. No. 56-8140, which corresponds to U.S. Pat. No. 4,319,268, where the detail emphasizing signals are produced by digitally processing relevant data. This system requires a memory capable of storing a large number of signals corresponding to the pictorial elements in the line being scanned and in plural adjacent scanning lines. This System also requires a complicated electronic circuit to perform digital computations for each of the numerous pictorial elements that are to constitute a duplicated picture.

It is therefore an object of the invention to provide a picture scanning and recording method and apparatus which are free from the aforementioned disadvantages of the known methods.

In particular, another object of the invention is to provide such a method and an apparatus for producing two series of signals, e.g. "sharp" signals and "unsharp" signals, by alternately scanning an original picture by means of different beams of light or laser in alternate half periods of each scanning period, temporarily storing the preceding series of said signals, e.g. "sharp" or "unsharp" signals, in a memory to thereafter be retrieved for synchronized processing with the following series of signals, e.g. "unsharp" or "sharp" signals.

According to the invention, the scanning beams have different sizes of focused areas on the picture and are adapted to be detected by a single common photoelectric converter when advancing along principal scan passages at different time periods determined by switching in the principal scan direction or by a preset displacement in the subordinate scan direction. A series of final image signals, computed from the above signals, serve to control an exposing or recording scan beam which produces a duplicated picture with a high contrast.

The invention, by utilizing a single photoelectric converter to produce during different time periods two series of signals capable of being synchronized, eliminates the possibility of inconformity or distortion in detail emphasizing signals. In short, the invention advantageously provides duplicated pictures of good quality and utilizes a simpler scanning structure than prior art devices.

Other objects and advantages of the invention will become clear in the following description of a preferred embodiment shown in the drawings.

BRIEF DESCRIPTION OF THE DRAWINGS

In the drawings:

FIG. 2 is a schematic diagram illustrating an embodiment of a flying spot scanning system comprising a scanning function and a recording or exposing function;

DETAILED DESCRIPTION OF THE PREFERRED EMBODIMENT

Figure 1A:
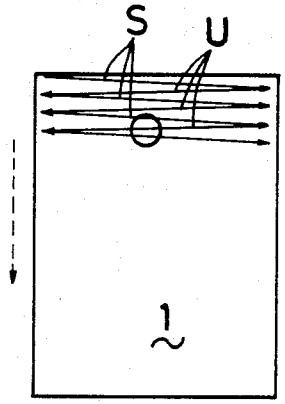
FIGS. 1A, 1B and 1C schematically show two patterns of scanning lines that can be utilized in the invention.
Figure 1B:
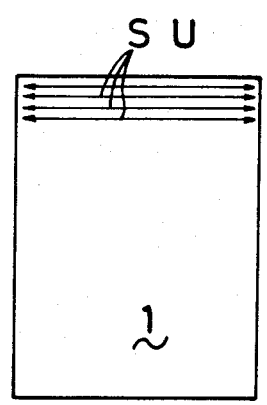
Figure 1C:
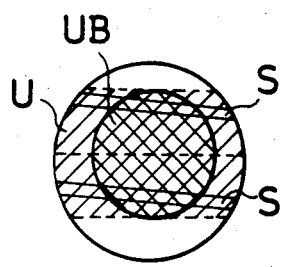

As illustrated in FIGS. 1A, 1B and 1C, an original picture 1 is scanned by scanning lines, the centers of scanning beams of light or laser tracing a continuous locus or discontinuous loci on the picture. Solid arrows indicate directions of principal scanning lines while broken arrows show a subordinate scanning direction.

The original picture 1 may be fed in the subordinate direction either continuously at a predetermined speed, as shown in FIG. 1A, or intermittently at a desired pitch as shown in FIG. 1B, in the subordinate direction. During the feeding of said picture 1 it is photoelectrically scanned by the scanning beams of light or laser in the principal directions. On the forward passages S of said principal scanning motion, the diameter of the focused scanning beam is smaller than on the backward passage U. The sharply focused beam is adapted to produce the socalled "sharp" signals whereas the blurredly focused beam is used to produce the socalled "unsharp" signals.

Detail emphasizing signals are obtained by comparison of the "sharp" signals with the "unsharp" signals as mentioned hereinbefore. Therefore, it is most desirable that each "unsharp" signal correspond to the same point in the scanned picture 1 to which each "sharp" signal corresponds while only said "unsharp" signals represent the depth of mono- or polychromatic color of fine area adjacent and surrounding the said point in the picture. From this point of view, the scanning pattern shown in FIG. 1B may be better than that shown in FIG. 1A. It is, however, to be noted that the scanning pattern in FIG. 1A can also produce the detail emphasizing signals of practical value because the blurredly or widely focused scanning beam UB covers a comparatively wide area including plural scanning lines adjacent each other, as illustrated in FIG. 1C.

The important feature of this invention resides, as will be apparent from the description herein, in that the scannings by the sharply focusing beam for said "sharp" signals are conducted in the different periods from those for the scannings by the widely focusing beam for said "unsharp" signals. It is therefore not necessary to modify the characteristic of one of said scanning beams of light or laser so as to obtain undistorted "sharp" and "unsharp" signals. Moreover, a single photoelectric converter is advantageously utilized for producing said electric "sharp" and "unsharp" signals to thereby exclude from the obtained data any errors originating from possible differences in sensitivities of dual converters or photosensors used in the known systems. The detail emphasizing signals produced from such "sharp" and "unsharp" signals are thus so clear that they give a reproduced picture of excellent quality.

The abovementioned period separation in the scannings for the "sharp" signals and the "unsharp" signals requires temporary storage of preceding signals ("sharp" or "unsharp") as well as synchronization thereof to the following signals ("unsharp" or "sharp"). In an embodiment of the invention, the preceding "sharp" signals are stored in a memory device and synchronously read out when the following "unsharp" signals are produced, so that said two kinds of signals are calculated to give corresponding detail emphasizing signals. The latter are further processed to semi-finished image signals and subsequently stored in another memory device. The semi-finished stored image signals in turn are read out synchronously with the next run of "sharp" signals scanned so as to control a recording scan beam of light or laser to thereby form on a record paper a reproduced picture. This picture has plural emphasized portions which correspond to the detail portions in said original picture 1.

FIG. 2 illustrates an apparatus for carrying out the above method and includes a scanning mechanism and a recording mechanism both designed to form a flying spot scanning system.

The apparatus is provided with a deflecting means such as a galvanomirror 8 which is oscillated at a preset interval of time such that a laser beam 1 is oscillated in the principal direction of scanning. A plane original picture 1 and a plane photosensitive material 6 are simultaneously scanned by a single source 9 of laser to thereby reproduce the picture on the photosensitive material.

The laser beam 1 from said source 9 is divided into four beams by means of three half mirrors. One of the divided laser beams $l_1$, scans a photosensor array 36 via the galvanomirror 8 and a mirror 13'. Another divided beam, $l_2$ advances through an acousto-optic modulator (AOM) 18 to an optical means 14 comprising a beam expander for converting the beam $l_2$ into a scanning beam SB adapted for production of "sharp" signals and having a larger beam diameter. Yet another divided beam $l_3$ advances through another AOM 19 and is converted by another optical means 15 into a scanning beam UB of a smaller beam diameter. The optical means 15 also comprises a beam expander. The last divided beam $l_4$ travels through another AOM 35 to scan and expose the photosensitive material 6 by means of the galvanomirror 8. It is noted here that a beam of larger diameter is more intensively converged by a converging lens 41 than a beam of smaller diameter. The scanning beam SB, which should sharply focus on the picture, is therefore made from the thicker beam incident upon the lens.

The above described optical system further comprises a f·θ lens disposed on the downstream side of the deflecting means, i.e. galvanomirror 8. This lens (not shown) compensates for variations in the passage distance traversed by laser beams between the converging lenses 41 and the picture 1 or the photosensitive material 6, such variation resulting from the oscillation of said galvanomirror. Said f·θ lens is adapted to automatically shift the focus positions in accordance with said oscillation so that both the original picture and the photosensitive material can be held plane. In other words, they would be caused to be held in a curved state in the event that said lenses were not employed in the optical system.

An electronic system of the above apparatus will be explained below by referring to FIGS. 2 to 4.

A pulse generator 13 comprises the photosensor array 36 and a phased lock loop (PPL) circuit. The photosensor array 36 is cylindrical and comprises an outer layer of striped pattern consisting of transparent zones and opaque zones arranged alternately. Photodiodes, charge coupled devices (CCD) and other solid state elements are carried in a core portion of said cylindrical array 36. Consequently, the latter generates pulse signals when it is scanned by the divided beam $l_1$ of raser shown in FIG. 2. The TTL circuit modifies these pulses into a series of clock pulses having a desirable frequency.

A mirror 16 and a half mirror 17 cause the scanning beam UB for U1 (i.e. "unsharp") signals to travel along the same passage as the other scanning beam SB for S1 (i.e. "sharp") signals. Both the scanning beams SB and UB are reflected by a further mirror 2' such that they can scan the original picture 1 and then be reflected by the surface thereof to thereby be sensed by a photoelectric converter 2. The converter 2 is a photosensor array or a photo-multiplier or the like which comprises photodiodes, CCD or other equivalents thereof. Thus, the "sharp" signals S1 and the "unsharp" signals U1 are produced by the single common converter 2.

The scanning beam UB is not emitted from the AOM 19 while the scanning beam SB is being emitted from the AOM 18. Namely, these acoustico-optical modulators (AOM) 18, 19 are alternately energized within each scanning period of the original picture 1, one of them operating during one half period (forward scan or backward scan) and the other AOM operating during the other half period (backward scan or forward scan). These AOM 18, 19 in turn are driven by drive circuits 18', 19' respectively in an on-off type of control mode. Said circuits are controlled by output signals produced by a flip flop (FF) 40 which repeats its set state and reset state at an interval corresponding to each half period of the scanning.

The flip flop 40 is set by an output pulse P1 of a photosensor 20, and is reset by an output pulse P2 of another photosensor 21. These photosensors are located, respectively, at the left end and the right end of the grating pattern on the photosensor array 36 so as to detect the leftmost and rightmost positions of said scanning beams SB, UB to be detected.

Figure 3:
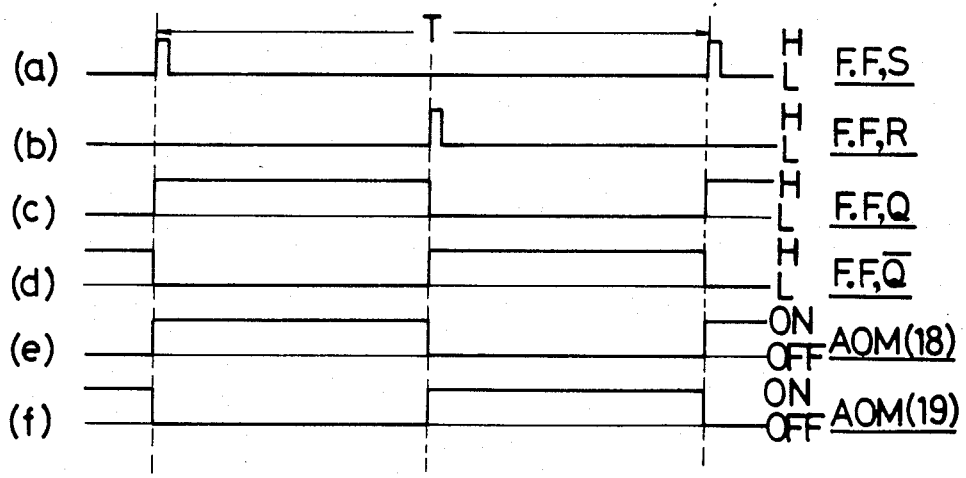
FIG. 3 is a time chart showing the operation of some elements of the system shown in FIG. 2.
Figure 4:
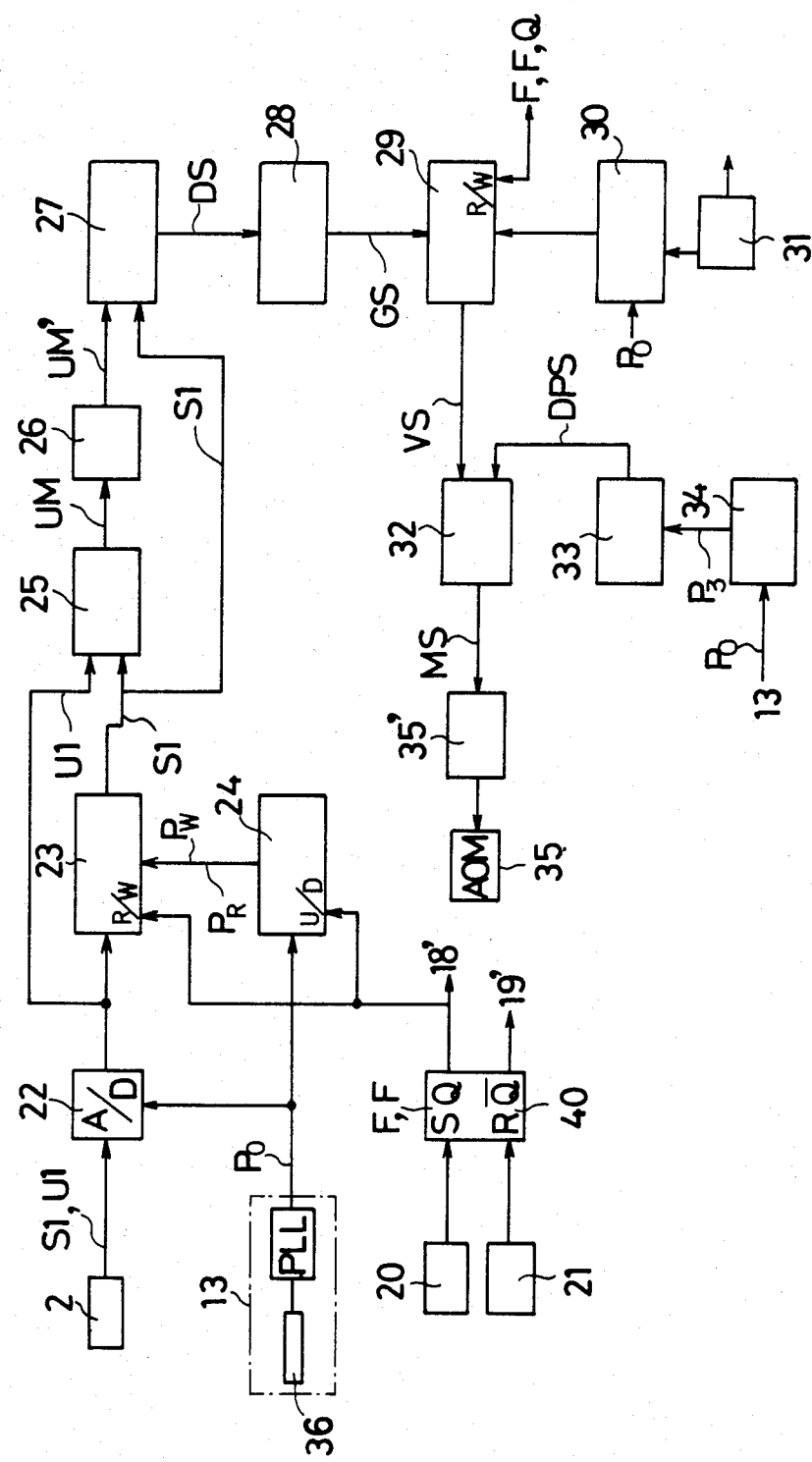
FIG. 4 is a block diagram of an electronic data processing device for the system shown in FIG. 2.

The timing chart given in FIG. 3 shows activation timings o the above-described control elements. A line (a) represents an output pulse P1 of the photosensor 20 while a line (b) represents an output signal P2 of the other photosensor 21. A span T corresponds to one period of scanning, and a line (c), (d), respectively, depict outputs at terminals Q and $\overline{Q}$ of the flip flop 40. The other lines (e), (f) illustrate activated states of the AOM 18 and AOM 19, respectively.

As seen from FIG. 3, the terminal Q of the flip flop 40 generates its high level output H while the other terminal $\overline{Q}$ generates its low level output L when the photosensor 20 gives the output pulse corresponding to the leftmost position of said scanning beam. Consequently, the AOM 18 is energized and the other AOM 19 is deenergized such that the scanning beam SB is transmitted through the AOM 18 to the galvanomirror 8 while the other scanning beam UB is cut off by the other AOM 19. The scanning beam SB thus runs rightwardly on the original picture 1 until the righthand photosensor 21 detects the rightmost position of said beam causing it to generate its output pulse P2. This output pulse will invert the state of said flip flop 40 so as to deenergize the AOM 18 for the beam SB and to energize the AOM 19 to thereby transmit the beam UB therethrough to upon the galvanomirror 8.

The switching between the beams SB and UB may also be effected by, for example, electromagnetic shutters in place of the abovesaid acoustico-optical modulators (AOM). Another valuable switching means may be a shutter which comprises a cylindrical or circular rotor and transparent and opaque portions, both arranged alternately on the surface of the rotor. Said rotor is driven to rotate in a period which is a multiple of the scanning period so that the numbers of the transparent and opaque portions respectively correspond to the multiple to thereby alternately transmit and cut off the scanning beam SB or UB.

In a still another modification of the arrangement shown in FIG. 2, the photosensors 20, 21 are not disposed on the photosensor array 36 but on the surfaces holding the original picture 1 or the photosensitive material 6. In this case, a white light may be utilized as the source of the light beams.

Signal processing in the above apparatus will now be described in more detail with reference to FIG. 4, i.e. a block diagram of a computing circuit.

The photoelectrical converter 2 alternately produces the "sharp" signals $S_1$ and the "unsharp" signals $U_1$ which are then transmitted to an analog-to-digital (A/D) converter 22 where they are converted into quantum numbers by means of clock pulses fed from the pulse generator 13. The quantumized signals $S_1$ and $U_1$ are fed to a memory device 23 which, in response to an instructing pulse from the flip flop 40, is adapted to store these signals therein at addresses designated by address appointing signals Pw fed from an up-down counter. These operations are first conducted for the preceding image signals, for instance, for the signals $S_1$ produced by means of the scanning beam SB.

Then, the state of said flip flop 40 will be inverted when the scanning of the original picture 1 by the other beam UB starts. Simultaneously, the gates of said memory device 23 are changed in state to read out the signals stored therein, and at the same time the updown counter 24 begins to function as a down counter. Thus, the series of "sharp" signals $S_1$ in the memory device 23 are read out therefrom in in reverse order such that the last signal is discharged at first. These reversed series of said digitalized signals $S_1$ are successively fed into a subtractor 25 to which the "unsharp" signals $U_1$ are also directly fed after quantumization in the A/D converter.

Retrieving the stored "sharp" signals $S_1$ in reverse order enables the "unsharp" signals $U_1$, generated by the reversed scanning direction as shown in FIG. 1A, and the stored "sharp" signals to be substantially coincident with each other in respect of their corresponding positions in the original picture.

The subtractor 25 computes a series of differences between each of the signals $S_1$ and each of the signals $U_1$, both the signals being produced synchronously with the clock pulse $P_o$. Said differences, designated here as "unsharp mask signals" UM, are then fed to a sharpness adjuster 26 which multiplies the signals UM by a suitable factor to produce "modified unsharp mask signals" UM'. The latter signals determine a degree of detail emphasis or contrast and they are subsequently conducted to an adder 27 which is also supplied with the quantumized "sharp" signals $S_1$ synchronous with the clock pulse $P_o$. The adder 27 calculates a series of halffinished image signals DS each of which is emphasized corresponding to detail portions in the original picture 1. These signals DS are fed to a further memory 29 after being processed into signals GS by a graduation control circuit 28 which is adapted for tone correction of the signals DS.

The memory 29 has a structure adapted to read said signals DS stored therein with repetition or omission of the addresses assigned to said signals to thereby provide a reproduced picture of desirable magnification as previously set by a magnification controller 30. The magnification control is fully disclosed in Japanese Early Publication Gazettes (Patent) Nos. Sho. 53-11601, Sho. 54-35613 and Sho. 54-65601 in the name of the applicant in this application so that a detailed description of said controller is abbreviated herein. The signals GS are arranged in the memory 29 in the order of the scanning direction of the "unsharp" signals $U_1$. It is therefore necessary, in order to avoid producing a mirrored or reversal image, to read these signals GS in a reversed direction when the next scanning run for the next series of "sharp" signals $S_1$ is carried out.

The sharpness adjuster 26 and the gradation control circuit 28 are not necessarily indispensable to the invented apparatus, but any known device such as is utilized in facsimile systems or in scanners for photomechanical systems may be substituted therefor.

Magnification control in the subordinate scanning direction is performed by means of a magnification adjuster 31 by varying the feeding speed of the picture 1 or the material 6 in said direction.

The signals GS in the memory 29 are then taken therefrom to a comparator 32 as input signals VS in synchronism with said next scanning run for the "sharp" signals $S_1$. The comparator 32 is also supplied with "halftone dot" signals DPS produced by a halftone dot signal generator 33 synchronously with said scanning run for said signals $S_1$. Half-tone or cross line image signals MS are thus produced as final image signals by comparison of said input signals VS with the halftone dot signals DPS, the signals MS thereby representing the print densities of each point in the original picture. Said half-tone or cross line signals MS are subsequently sent to the AOM 35 via a drive circuit 35' therefor to control in on-off mode the recorder beam of raser WB. Thus, the photosensitive material 6 is exposed to develop a duplicated image with a desired contrast.

The abovesaid generator 33 functions like a memory which stores therein a series of digitalized density values corresponding to finely divided portions of a single unsharp dot in a contact screen. An address appointing circuit 34 serves to provide the generator 33 with address signals $P_3$. The discharge of the signals DPS from the generator 33 is in synchronism with the clock pulse $P_o$ and the "sharp" signals scanning run.

The invented apparatus is available not only for the above-described scanning on the flat surface but also for curved surface scanning if the original picture and/or the photosensitive material are held on cylinders rotating in the subordinate scanning direction.

Individual devices synchronously driven for deflecting the scanning beams and the exposing beam may be equipped in place of the common galvanomirror shown in FIG. 2. Such devices are not limited to the oscillating mirror. They can be polygonal cylindrical mirrors comprising a plurality of plane mirror plates. The scanning beams having different sizes of focused dots will alternately be projected upon the different mirror plates. It will be understood that in such modification the reading order of memories should be contrary to that in the illustrated embodiment.

It is also apparent that plural sources of light or raser may be incorporated into the apparatus. For example, the scanning beams and the exposing beam can be emitted from different sources.

What is claimed is:

1. A picture scanning and recording method comprising the steps of:
    photoelectrically scanning an original picture by means of at least one deflecting means adapted to reflect plural beams of light incident thereupon onto said picture,
    producing final image signals from electric signals obtained by the step of photoelectrically scanning, and
    recording a duplicated picture by controlling a recording scan beam of light by means of the image signals, wherein two kinds of scanning beams respectively having different sizes of focused areas are used in photoelectrically scanning the original picture in a principal scan direction in such a manner that said two kinds of beams are switched over from one to another alternately at intervals of half a period of the photoelectrically scanning motion.

2. A picture scanning and recording method as set forth in claim 1, wherein said two kinds of scanning beams are used respectively for producing raw image signals and unsharp signals.

3. A picture scanning and recording method as set forth in claim 2, wherein one of two series of the raw image signals and the unsharp signals which are obtained by a preceding run of the photoelectrically scanning motion by means of one of the scanning beams are temporarily stored in a memory to thereafter be read out from the memory synchronously with a following run of said scanning motion by means of the other scanning beam.

4. An apparatus for photoelectrically scanning an original picture by means of plural scanning beams of light projected on at least one deflecting means and reflected therefrom so as to produce series of image signals adapted to control a recording scan beam for recording a duplicated picture on a photosensitive material, the apparatus comprising:
    means for generating two scanning beams of different sizes of focused areas on the original picture, the beams being oscillated in a principal scanning direction;
    means for generating a recording scan beam synchronized with one of said two scanning beams so as to expose the photosensitive material;
    means for alternately switching over from one of the scanning beams to the other scanning beam to thereby alternately project each of said scanning beams to the deflecting means at an interval of half a scanning period of the original picture;
    a photoelectrical converter adapted to detect said scanning beams projected on the picture for subsequent production of the series of image signals corresponding to said beams;
    means for electronically processing the image signals produced by the converter so as to make a series of final image signals; and
    control means adapted to control the recording scan beam by means of said final image signals.

* * * * *